Figure 1:
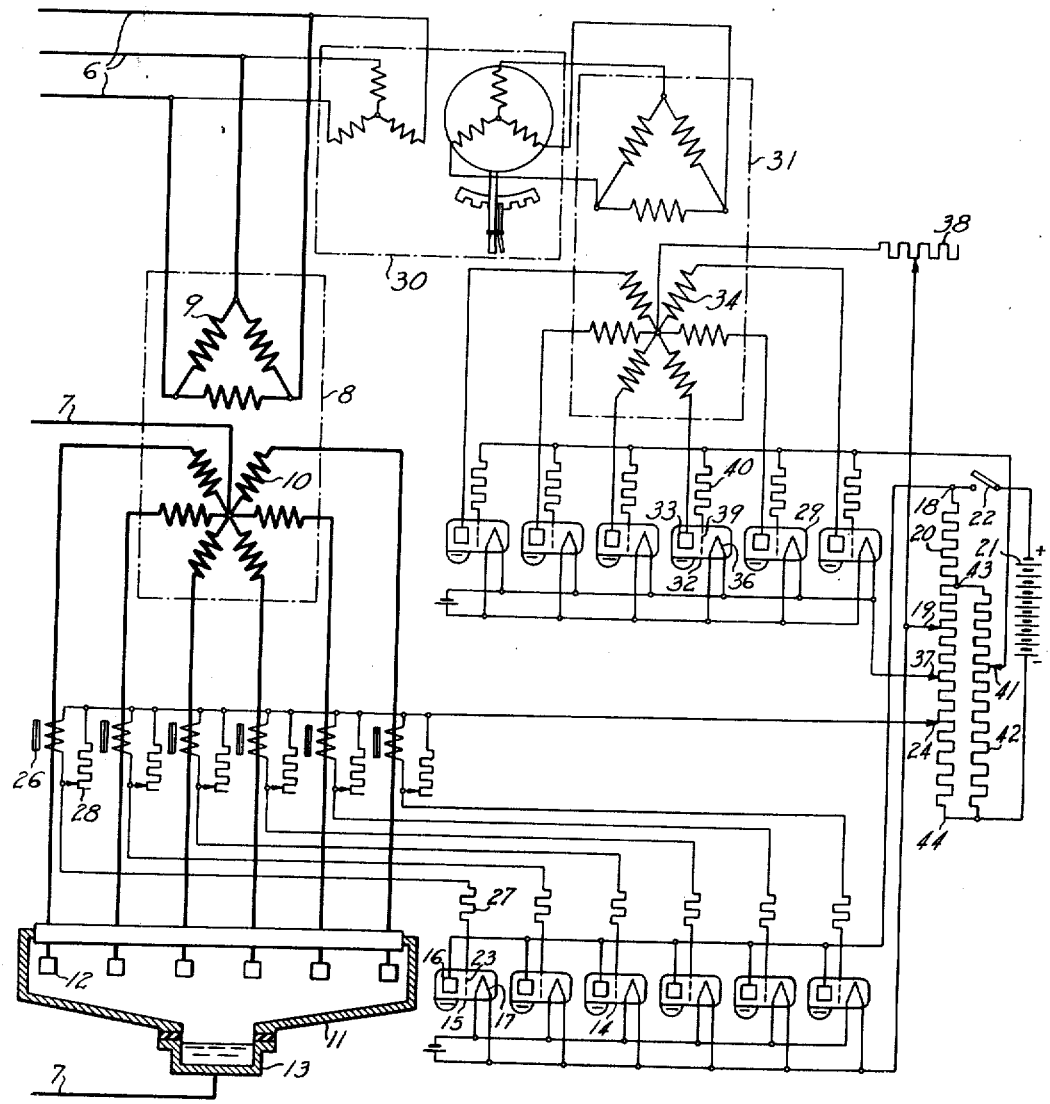

May 19, 1942.   H. WINOGRAD   2,283,344
ELECTRIC TIMING SYSTEM
Filed May 22, 1940   2 Sheets-Sheet 1

Inventor
H. Winograd
by
Attorney

May 19, 1942.    H. WINOGRAD    2,283,344
ELECTRIC TIMING SYSTEM
Filed May 22, 1940    2 Sheets-Sheet 2

Inventor
H. Winograd
by G. J. Belkin
Attorney

Patented May 19, 1942

2,283,344

UNITED STATES PATENT OFFICE 2,283,344

ELECTRIC TIMING SYSTEM

Harold Winograd, Milwaukee, Wis., assignor to Allis-Chalmers Manufacturing Company, Milwaukee, Wis., a corporation of Delaware Application May 22, 1940, Serial No. 336,509

9 Claims. (Cl. 177—311)

This invention relates in general to improvements in electric timing systems and more particularly to means for determining the time of occurrence and the duration of events in relation with the voltage cycle of a source of alternating current.

The duration of operation of a machine having an operating cycle of the order of a fraction of a second is generally determined by means of oscillographic records of at least one electric current controlled by the machine and of a reference current supplied by an alternating current source. While such determination gives the desired result with a high degree of precision, the necessary apparatus is cumbersome as well as expensive and its operation involves developing and measuring a photographic record. When the measurement requires an accuracy of the order of one cycle or of a relatively large fraction of one cycle of the reference voltage, it is therefore preferable to utilize for such measurement a system comprising a plurality of current responsive means operable in sequence during successive cycles or fractions of a cycle of the reference alternating current source. By placing the circuits of such current responsive means under the control of the machine to be observed, a direct indication is obtained of the relation between initiation and termination of the machine operation and the voltage cycle of the reference source. The same means may likewise be utilized for indicating the time of occurrence of an operating condition of an electric circuit with respect to the voltage cycle of the reference alternating current source. This system may also be provided with control elements for controlling the initiation and duration of operation of an electric circuit in dependence upon the voltage cycle of the reference source.

It is therefore one of the objects of the present invention to provide a timing system for directly indicating the relation between the duration of an operating period of an electric circuit and the voltage cycle of a reference source of alternating current.

Another object of the present invention is to provide a timing system for directly indicating the time of occurrence of an operating condition of an electric circuit relative to the voltage cycle of a source of alternating current.

Another object of the present invention is to provide a timing system for controlling the operation of an electric circuit in dependence upon the voltage cycle of a source of alternating current.

Figure 2:
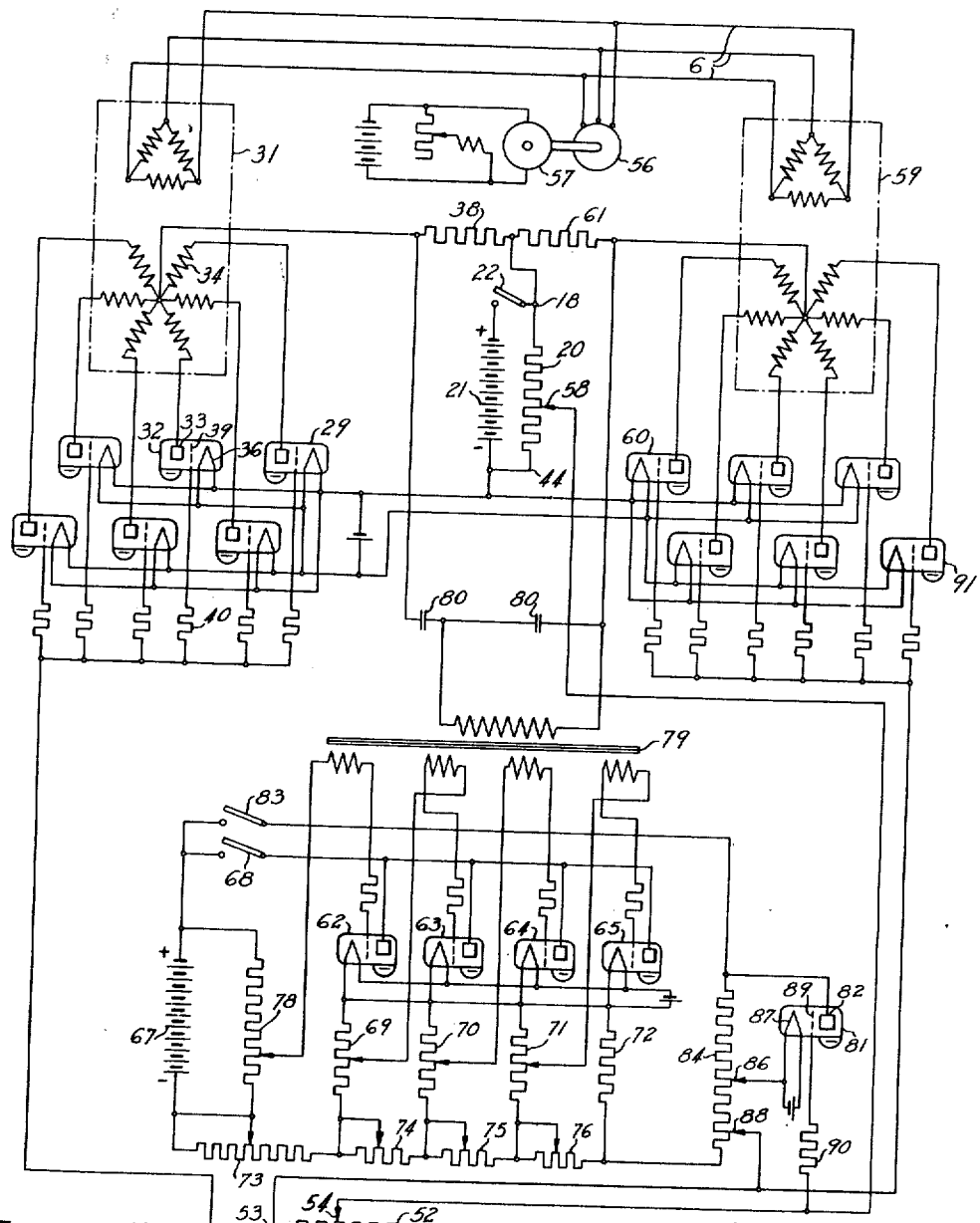

Objects and advantages other than those above set forth will be apparent from the following description when read in connection with the accompanying drawings, in which:

Fig. 1 diagrammatically illustrates one embodiment of the present invention for indicating the time of occurrence of a disturbance in an electric translating system; and Fig. 2 diagrammatically illustrates another embodiment of the present invention for measuring the speed of operation of an electric switch.

Referring more particularly to the drawings by characters of reference, reference numeral 6 designates an alternating current circuit serving as source of polyphase periodic current for a translating system transmitting current therefrom to a direct current circuit 7. The translating system is assumed to be of the electric valve type and comprises a transformer 8 having a primary winding 9 energized from circuit 6 and a secondary winding 10 connected in star. The system further comprises a plurality of electric valves generally designated by 11. Valves 11 are assumed to be of the vapor type provided with anodes such as anode 12 severally connected with the terminals of winding 10. The anodes of valves 11 are preferably arranged within a common casing, the cathodes of the valves then being combined into a common cathode structure 13. The two main conductors of circuit 7 are severally connected with cathode 13 and with the neutral point of winding 10. Circuit 7 is closed therebetween by a plurality of branches each comprising one of the phase portions of winding 10 and one of valves 11. As a result of this arrangement, circuit 7 is subject to a plurality of normal and abnormal operating conditions. In particular, each branch thereof is subject to reverse flow of current in the event of a backfire therein, i. e., failure of the valve action of the anode inserted in the branch. Occurrence of a backfire at the anode of a valve 11 may result in the occurrence of subsequent backfires at other anodes.

Valves 11 are associated with a system responsive to the first occurrence of a reverse flow of current in any one of the branches of circuit 7 for indicating the location of such occurrence. This system comprises a plurality of auxiliary electric valves generally designated by 14 of the discontinuously controllable type in which operating vapor is preferably produced by a drop of mercury. Among valves 14, valve 15 for example, is provided with an anode 16 and a cathode 17 connected between terminal 18 and tap 19 of a voltage divider 20. The voltage divider is arranged to be energized from a suitable source of direct current, such as a battery 21, through a switch 22.

Valve 15 is provided with a control electrode 23 connected with cathode 17 through portion 19—24 of voltage divider 20, the secondary winding of a current transformer 26 and a current limiting resistor 27. The secondary winding of the current transformer 26 is shunted by an adjusting rheostat 28 and the primary winding thereof is inserted in the branch of circuit 7 comprising anode 12. The other valves 14 have their principal electrodes connected in parallel with those of valve 15 but their control electrodes are connected with voltage divider 20 through current transformers severally associated with the different anodes of valves 11 other than anode 12.

Further means connected with circuit 6 cooperate with auxiliary valves 14 in response to the relation between the time of occurrence of a backfire through any one of valves 11 and the voltage cycle of circuit 6. The latter means comprise another plurality of auxiliary electric valves of the discontinuously controllable type generally designated by 29. Valves 29 are sequentially supplied with current impulses from circuit 6 through a phase shifter 30, a transformer 31 and a portion of voltage divider 20. Phase shifter 30 controls the voltage cycle of transformer 31 to control the periods of current flow through valves 29. Of the different valves 29, valve 32 for example, is provided with an anode 33 connected with a terminal of secondary winding 34 of transformer 31 and a cathode 36 connected with a tap 37 of voltage divider 20.

The neutral point of winding 34 is connected with tap 19 of voltage divider 20 through a resistor 38 to cause the voltage impressed between anode 33 and cathode 36 to be unidirectional when either none of valves 29 or only valve 32 is conductive. This condition is obtained if the peak value of the phase voltage of winding 34 is less than the voltage drop between taps 19 and 37 of voltage divider 20. Valve 32 is provided with a control electrode 39 connected through a resistor 40 with a tap 41 of a second voltage divider 42 connected between a tap 43 and negative terminal 44 of voltage divider 20. The remaining valves 29 are connected similarly to valve 32 with different phase portions of winding 34 to render the valves selectively responsive to the relation between the voltage cycle of circuit 6 and the time of occurrence of a predetermined operating condition of valves 11, namely, of the first backfire to occur in any valve 11.

In operation, circuit 6 being energized from a suitable generator (not shown) and circuit 7 being connected with suitable current consuming devices (not shown) valves 11 sequentially transmit unidirectional current impulses combining at cathode 13 to form a flow of direct current supplied to circuit 7 as is well known.

All valves 11 operate in the same manner and the operation of only one valve will therefore be considered in further detail. Anode 12, for example, carries unidirectional current impulses inducing a dissymmetrical alternating current in the secondary winding of current transformer 26 and through rheostat 28. Upon closure of switch 22, voltage divider 20 impresses on the anodes of valves 14 a unidirectional potential tending to cause valves 14 to carry current. At the same time, however, the control electrodes of valves 14 receive from tap 24 of voltage divider 20 a negative potential maintaining the valves non-conductive. The voltage drop in rheostat 28 is impressed between cathode 17 and control electrode 23 with such polarity that the smaller of the two half waves of such voltage renders control electrode 23 more positive to tend to render valve 15 conductive. Rheostat 28 and tap 24 are so adjusted, however, that under normal operating conditions control electrode 23 remains continuously negative with respect to the potential of cathode 17 and valve 15 remains non-conductive. The other valves 14 likewise remain non-conductive.

During this operation, winding 34 impresses on the anodes of valves 29 polyphase potentials superposed on a common unidirectional potential obtained from tap 19 of voltage divider 20. The control electrodes of valves 29 are then maintained at a positive potential with respect to the potential of the associated cathodes from tap 41 of voltage divider 42. Valves 29 accordingly become sequentially operative in dependence upon the voltage cycle of circuit 6 and carry consecutive current impulses resulting in a flow of direct current from the cathodes of valves 29 through tap 37, voltage divider 20, tap 19 and resistor 38 to the neutral point of winding 34. The different valves become operative during predetermined intervals of each cycle of the voltage of circuit 6, each interval being equal to one cycle divided by the number of valves. The number of valves 29 is not related to the number of valves 11, and may be chosen as high as desired for increasing the accuracy of the system.

Upon occurrence of a backfire at anode 12, for example, anode 12 operates as a cathode and the remaining anodes thereupon supply thereto a large current flowing through the primary winding of current transformer 26 in a direction reverse of the normal direction of flow. The initiation of this large reverse current induces in the secondary winding of current transformer 26 a relatively high voltage which overcomes the negative voltage impressed between cathode 17 and control electrode 23 from portion 19—24 of voltage divider 20, and valve 15 is rendered conductive. Valve 15 then short circuits portion 18—19 of voltage divider 20 with the result that substantially the entire voltage of battery 21 is impressed between tap 19 and terminal 44. The voltage drop between taps 19 and 24 is thereby increased to such an extent as to prevent any valve 14, other than valve 15, from being rendered conductive in response to occurrence of any backfire subsequent to the backfire at anode 12. Valve 15, however, remains conductive and continues to carry current regardless of the potential of control electrode 23. The flow of current through valve 15 is evidenced by the luminosity of the valve which indicates that a backfire occurred at anode 12 before the possible occurrence of further backfires at other anodes.

The occurrence of a backfire in any one of valves 11 is not related with the sequence of operation of valves 29 and it may be assumed that at the time of operation of valve 15, valve 32 was carrying current, the other valves 29 then being inoperative. Upon operation of valve 15, the potential of tap 41 of voltage divider 42 becomes negative with respect to the potential of tap 37 of voltage divider 20 by reason of the short circuiting of portion 18—19 of voltage divider 20 by valve 15. The control electrodes of valves 29 other than valve 32 accordingly prevent such valves from again becoming conductive, thereby interrupting the sequence of operation of valves 29. Valve 32 is thus selectively maintained in operation and carries current continuously as the voltage impressed thereon from winding 34 and voltage divider 20 is unidirectional. The flow of current through valve 32 may be ascertained either by observing the luminosity of valve 32 or by means of one of suitable known current responsive devices (not shown) serially connected with the different valves 29. The flow of current through valves 11 resulting from the backfire may be interrupted by any suitable known means.

The deduction of a useful conclusion from the indications of the system requires observation of both sets of valves 14 and 29. The particular valve 14 conducting current indicates which valve 11 was subjected to a backfire or to the first of a series of backfires. The relation between the normal inoperative period of the backfiring valve 11 and the voltage cycle of circuit 6 is then known from the connections of transformer 8. The only valve 29 continuing to carry current indicates the relation between the time of occurrence of the backfire and the voltage cycle of circuit 6. These two relations give directly the relation between the time of occurrence of the backfire and the idling period of the backfiring anode.

In the embodiment illustrated in Fig. 1, the idling period of anode 12 lasts $5/6$ of a cycle and the operating period of each valve 29 lasts $1/6$ of a cycle. A backfire at anode 12 therefore may occur during the operating periods of five of valves 29. The occurrence of a backfire during the operating period of valve 32, for example, indicates that the backfire was initiated during the third fifth of the idling period of anode 12. The different combinations of valves 14 and 29 remaining conductive and the corresponding times of occurrence of backfires through the different valves 11 may be tabulated in advance for reference.

The accuracy of the readings depends on the number of valves 29 utilized and the maximum error is less than $1/6$ of a cycle of circuit 6 when six valves 29 are provided. If a series of observations indicates that backfires occur most frequently during a particular fifth of the idling period of valves 11, another series of observations may be made with the voltage of transformer 31 displaced to a suitable extent by means of phase shifter 30. For example, if the voltages of transformer 31 are displaced by thirty electrical degrees, the periods of operation of valves 29 during one test overlap by one half the periods of operation of the valves during the other test. By comparing the results of the two tests it may be possible to deduce that the backfires occur generally within a particular period of overlap, whereby the error of the measurements is reduced to less than $1/12$ of the voltage cycle of circuit 6.

The embodiment illustrated in Fig. 2 is assumed to the utilized for measuring the speed of operation of a switch 46. For this purpose the system is rendered responsive to the relation between the voltage cycle of circuit 6 and the duration of an operating condition of a direct current circuit 47 controlled by switch 46. Circuit 47 is energized from a suitable direct current generator 48 and comprises a closing switch 49 and a current adjusting resistor 50 provided with an adjustable tap 51 connected with the control electrodes of valves 29. Switch 46 is bridged by a resistor 52 of high resistance having negative terminal 53 and an adjustable tap 54.

In the present embodiment transformer 31 is assumed to be directly connected with circuit 6, which is energized at variable frequency from an alternating current generator 56 driven by a variable speed motor 57. By varying the speed of motor 57 the voltage cycle of circuit 6 may be controlled to control the periods of current flow through valves 29. Voltage divider 20 is provided with a tap 58 connected with the control electrodes of valves 29 through tap 54, resistor 52, resistor 50 and tap 51 for interrupting the sequence of operation of valves 29 in response to initiation of the flow of current through circuit 47.

The present embodiment comprises a second transformer 59 identical to transformer 31 and a second plurality of electric valves 60 similar to valves 29 and likewise connected for becoming sequentially operative in dependence on the voltage cycle of circuit 6. The secondary neutral point of transformer 59 is connected with terminal 18 of voltage divider 20 through a resistor 61 identical to resistor 38. The cathodes of valves 60 are connected with terminal 44 of the voltage divider and the control electrodes of valves 60 are connected with terminal 53 for interrupting the sequence of operation of valves 60 in response to termination of the flow of current through circuit 47.

When the flow of current through circuit 47 is expected to last longer than one full cycle of the voltage of circuit 6, there is provided a third plurality of discontinuously controllable electric valves in any desired number such as valves 62, 63, 64, 65. Valves 62 to 65 are connected with a suitable source of current such as a battery 67 through a switch 68 and through a system of resistors 69 to 76. The control electrodes of valves 62 to 65 are connected with resistors 69, 70 and 71 and with a resistor 78 connected across battery 67 through the secondary windings of a transformer 79. The valves 62 to 65 therefore sequentially become continuously operative in dependence upon the voltage cycle of transformer 79. The primary winding of transformer 79 is preferably connected across resistors 38 and 61 for rendering the transformer operative only upon initiation of the flow of current through circuit 47. The connections between transformer 79 and resistors 38, 61 may comprise means such as a capacitive voltage divider 80 for preventing the flow of a unidirectional current component through the transformer. Voltage divider 80 may also be arranged to shift the voltage of transformer 79 with respect to the alternating component of voltage appearing in resistors 38, 61.

Upon termination of the flow of current through circuit 47 resulting in operation of some of valves 62 to 65, the remaining inoperative ones of valve 62 to 65 are prevented from becoming operative by means of a single discontinuously controllable electric valve 81. The anode 82 of valve 81 is connected with battery 67 through a switch 83 and is connected with resistor 76 through a voltage divider 84. Voltage divider 84 is provided with an adjustable tap 86 connected with the cathode 87 of valve 81 and with another adjustable tap 88 connected with terminal 53. The control electrode 89 of the valve 81 is connected with tap 54 through a current limiting resistor 90.

In operation, the system being connected as shown in Fig. 2 and switch 22 being closed, the control electrodes of valves 29 are energized at a positive potential with respect to the potential of the associated cathodes from battery 21 through voltage divider 20, tap 58, tap 54, resistor 52, terminal 53, resistor 50 and tap 51. Valves 29 are accordingly rendered conductive and circuit 6 supplies current thereto to render the valves operative in sequence during each cycle of the voltage of circuit 6, as in the embodiment illustrated in Fig. 1. The control electrodes of valves 60 are also maintained at the potential of tap 58 through tap 54, resistor 52 and terminal 53. Valves 60 are also rendered conductive and carry current sequentially during each cycle of the voltage of circuit 6 in the same manner as valves 29. The joint output current of valves 29 flowing through resistor 38 and the joint output current of valves 60 flowing through resistor 61 are equal and substantially uniform direct currents. The voltage drops in resistors 38, 61 are therefore equal and no voltage is impressed on the primary winding of transformer 79.

Upon closure of switch 83, a voltage is impressed between anode 82 and cathode 87 of valve 81 from battery 67 through switch 83, voltage divider 84 and resistors 73 to 76. Control electrode 89 is then maintained at a negative potential with respect to the potential of cathode 87 through tap 86, voltage divider 84, tap 88, terminal 53, resistor 52, tap 54 and resistor 90. Valve 81 is accordingly maintained non-conductive and cannot carry current. The current flowing through voltage divider 84 and resistors 73 to 76 causes voltage drops in the different resistors maintaining the control electrodes of valves 62 to 65 at negative potentials with respect to the potentials of the associated cathodes. Valves 62 to 65 are accordingly maintained non-conductive and cannot carry current when the anodes thereof are connected with battery 67 by closure of switch 68.

The flow of current through circuit 47 is initiated by closing switch 49. Current then flows from generator 48 through switch 46, resistor 50 and switch 49. The voltage drop appearing between terminal 53 and tap 51 overcomes the voltage between tap 58 and terminal 44 of voltage divider 20 to bring the control electrodes of valves 29 to a negative potential with respect to the associated cathode potential. Those valves 29 which are then inoperative are thereby prevented from becoming operative. The valve 29 then carrying current, valve 32 for example, is caused to carry current continuously thereafter. The potential of the control electrodes of valves 60 is not affected by closure of switch 49 because resistor 52 is short circuited by switch 46.

The flow of current through valve 32 comprises a unidirectional component produced by battery 21 and an alternating current component produced by winding 34. The latter component is of the frequency of the voltage of circuit 6 and the resulting voltage drop in resistor 38 is impressed on the primary winding of transformer 79 through voltage divider 80. The voltage of transformer 79 will be assumed to be in phase with the voltage of the phase portion of winding 34 supplying valve 32. During the first half wave of the voltage of transformer 79, potential is impressed from the transformer on the control electrodes of valves 63 and 65 in such sense as to tend to maintain the valves non-conductive. An opposite potential is impressed on the control electrodes of valves 62 and 64, but such potential cannot overcome the potential impressed on the control electrode of valve 64 from resistor 75, with the result that valve 64 remains non-conductive. Resistors 73 and 78 are, however, so adjusted that the half wave of potential is able to render the control electrode of valve 62 more positive than the associated cathode. Valve 62 accordingly becomes conductive and continuously carries current supplied thereto from battery 67. The current of valve 62 flows through resistor 69, thereby raising the potential of the control electrode of valve 63 to slightly below the potential of the associated cathode.

Upon closure of switch 49, the flow of current through circuit 47 energizes the trip coil of switch 46, thereby causing the switch to open. It will be assumed, for example, that the flow of current through circuit 47 is interrupted by switch 46 in approximately one and a half cycles of the voltage of transformer 79. At the beginning of the second half cycle of this voltage, the transformer impresses on the control electrode of valve 64 a potential tending to maintain valve 64 non-conductive. The transformer also impresses on the control electrode of valve 65 a potential tending to render valve 65 conductive but which cannot overcome the negative potential impressed on the control electrode from resistor 76. Valve 65 therefore remains non-conductive. The transformer potential is also impressed on the control electrode of the valve 63, which is rendered more positive than the potential of the associated cathode by the combined potentials impressed thereon from transformer 79, resistor 74 and resistor 69. Valve 63 accordingly becomes conductive and continuously carries current supplied thereto from battery 67. This current flows through resistor 70, thereby raising the control electrode potential of valve 64 to slightly below the potential of the associated cathode.

In a similar manner, during the third half cycle of the voltage of transformer 79 valve 65 is maintained non-conductive while valve 64 is rendered conductive and carries current continuously thereafter.

When the flow of current through circuit 47 is completely interrupted by switch 46, a predetermined portion of the voltage of generator 48 is impressed between tap 54 and terminal 53. This voltage overcomes the voltage appearing between tap 58 and terminal 44 of voltage divider 20 and renders the control electrodes of valves 60 negative with respect to the associated cathodes. The particular valves 60 which were not operative are thereby rendered non-conductive and the valve 60 then carrying current, valve 91 for example, is selectively maintained in operation.

Valves 32 and 91 then simultaneously carry current, but the alternating components of the currents flowing through the two valves are generally not in phase coincidence. In most instances therefore an alternating potential continues to be impressed on the control electrodes of valves 62 to 65 from transformer 79 even after the flow of current through circuit 47 has ceased. Upon completion of the operation of switch 46, however, a predetermined portion of the voltage of generator 48 is impressed between tap 88 and control electrode 89 of valve 81, overcoming the voltage appearing between taps 86 and 88 of voltage divider 84 to render valve 81 conductive. Valve 81 short circuits a portion of voltage divider 84, thereby causing the flow of current across resistors 73 to 76 to increase. The negative potential impressed on the control electrode of valve 65 from resistor 76 is thereby increased to such an extent as to prevent transformer 79 from rendering valve 65 conductive.

After completion of the operation of switch 46, valves 32, 91, 62, 63 and 64 remain operative as evidenced by the luminosity thereof or by operation of suitable current responsive devices (not shown) serially connected therewith.

Operation of valves 62, 63, 64 indicates that the flow of current through circuit 47 was interrupted in approximately three half cycles of the voltage of circuit 6. Operation of valves 32, 91 indicates that such interruption required approximately ⅔ of a cycle of circuit 6 or ⅔ of a cycle in addition to an integral number of cycles. The operation therefore required approximately 1 and ⅔ cycles. The system may be returned to the original condition thereof by momentarily opening switches 22, 83 and 68, opening switch 49 and reclosing switch 46.

It will be understood that the accuracy of the system may be increased by the provision of valves 29, 60 in a number greater than six. Operations lasting more than two cycles of the voltage of circuit 6 may also be observed by adding a sufficient number of valves to the series of valves 62 to 65. To obtain the maximum accuracy possible with a given set of valves, the frequency of the voltage of circuit 6 should be adjusted to a sufficiently high value to cause operation of all valves 62 to 65. A check test may be made at a lower frequency at which only valves 62 to 64 operate to ascertain that the operation of switch 46 does not last longer than the period indicated by operation of valves 62 to 65.

Although but two embodiments of the present invention have been illustrated and described, it will be apparent to those skilled in the art that various changes and modifications may be made therein without departing from the spirit of the invention or from the scope of the appended claims.

It is claimed and desired to secure by Letters Patent:

1. In combination, a source of polyphase periodic current, an electric circuit subject to a predetermined operating condition, a plurality of electroresponsive means severally connected with the different phases of said source all successively operating during each voltage cycle of said source, and means responsive to occurrence of said condition for preventing starting of said electroresponsive means while maintaining said electroresponsive means connected with said source for maintaining in operation only the particular one of said plurality of means operating at the time of said occurrence.

2. In combination, a source of periodic current, an electric circuit subject to a predetermined operating condition, a plurality of electric valves connected with said source sequentially becoming continuously conductive at predetermined intervals not greater than one cycle of the voltage of said source, and means responsive to occurrence of said condition for maintaining non-conductive any of said valves not operating at the time of said occurrence.

3. In combination, a source of periodic current, an electric circuit subject to a predetermined operating condition, a plurality of electric valves connected with said source sequentially becoming continuously conductive in dependence upon the voltage cycle of said source, means responsive to initiation of said condition for rendering said source operative, and means responsive to termination of said condition for maintaining non-conductive any of said valves not operating at the time of said occurrence.

4. In combination, a source of polyphase periodic current, a plurality of electric valves, means comprising a high impedance and a source of direct current having a voltage higher than the peak voltage of said source of periodic current connecting said valves with said source of periodic current to cause said valves to carry current sequentially in dependence upon the voltage cycle of said source of periodic current, an electric circuit subject to a predetermined operating condition, and means responsive to occurrence of said condition for preventing starting of said valves, whereby the operative one of said valves is caused to carry current continuously.

5. In combination, a source of polyphase periodic current, a plurality of electric valves, means comprising a source of direct current connecting said valves with said source of periodic current to cause said valves to carry current sequentially in dependence upon the voltage cycle of said source of periodic current, an electric circuit comprising a plurality of branches subject to reverse flow of current, and means responsive to the first occurrence of a reverse flow of current in only those of said branches for rendering non-conductive any of said valves not operating at the time of said first occurrence.

6. In combination, a source of polyphase periodic current, a plurality of electric valves, means comprising a high impedance and a source of direct current having a voltage higher than the peak voltage of said source of periodic current connecting said valves with said source of periodic current to cause said valves to carry current sequentially in dependence upon the voltage cycle of said source of periodic current, means for controlling the voltage cycle of said source of periodic current to control the periods of current flow through said valves, an electric circuit subject to a predetermined operating condition, and means responsive to occurrence of said condition for preventing starting of said valves, whereby the operative one of said valves is caused to carry current continuously.

7. In combination, a source of periodic current, a source of direct current, a plurality of discontinuously controllable electric valves provided with principal and control electrodes so connected with said sources as to cause said valves to become conductive sequentially in dependence upon the voltage cycle of said source of periodic current, an electric circuit subject to a predetermined operating condition, and means responsive to occurrence of said condition for impressing negative potentials on said control electrodes while maintaining said valves connected with said sources for maintaining in operation any said valve operating at the time of said occurrence and for preventing the operation of the remainder of said valves.

8. In combination, a source of polyphase periodic current, a plurality of electric valves, means comprising a high impedance and a source of direct current having a voltage greater than the peak voltage of said source of periodic current connecting said valves with said source of periodic current to cause all said valves to carry current sequentially during each voltage cycle of said source of periodic current, an electric circuit subject to an operating condition, means responsive to initiation of said condition for preventing starting of said valves to cause the operating one of said valves to carry current having an alternating component, a second plurality of electric valves, a source of direct current connected with the second said valves for the supply of current thereto, means responsive to said alternating current component for causing the second said valves to become continuously conductive sequentially in dependence upon the voltage cycle of said alternating current component, and means responsive to termination of said condition for preventing starting of the second said valves.

9. In combination, a source of polyphase periodic current, a plurality of electric valves, means comprising a high impedance and a source of direct current having a voltage greater than the peak voltage of said source of periodic current connecting said valves with said source of periodic current to cause all said valves to carry current sequentially during each voltage cycle of said source of periodic current, an electric circuit subject to an operating condition, means responsive to initiation of said condition for preventing starting of said valves to cause the operating one of said valves to carry current having an alternating component, a second plurality of electric valves, a source of direct current connected with the second said valves for the supply of current thereto, means responsive to said alternating current component for causing the second said valves to become continuously conductive sequentially in dependence upon the voltage cycle of said alternating current component, a third plurality of electric valves, means comprising a second high impedance and the first said source of direct current connecting the third said valves with said source of periodic current to cause all the third said valves to carry current sequentially during each voltage cycle of said source of periodic current, and means responsive to termination of said condition for preventing starting of the second and third said valves.

HAROLD WINOGRAD.